United States Patent [19]

Lew et al.

[11] Patent Number: 5,355,737
[45] Date of Patent: Oct. 18, 1994

[54] SINGLE VIBRATING CONDUIT MASS FLOWMETER

[76] Inventors: Hyok S. Lew; Yon S. Lew, both of 7890 Oak St., Arvada, Colo. 80005

[21] Appl. No.: 55,280

[22] Filed: May 3, 1993

[51] Int. Cl.$^5$ ............................................. G01F 1/84
[52] U.S. Cl. ................................................. 73/861.38
[58] Field of Search ........................ 73/861.37, 861.38

[56] References Cited

U.S. PATENT DOCUMENTS

| | | | |
|---|---|---|---|
| 5,078,014 | 1/1992 | Lew | 73/861.38 |
| 5,131,280 | 7/1992 | Lew | 73/861.38 |

FOREIGN PATENT DOCUMENTS 0273500  11/1989  German Democratic Rep. ................................. 73/861.38

Primary Examiner—Richard E. Chilcot, Jr.
Assistant Examiner—Harshad Patel

[57] ABSTRACT

A Coriolis force mass flowmeter comprises a single conduit with two fixed extremities including two end sections respectively extending from the two fixed extremities of the conduit in over-hanging relationship and a looped midsection connecting the two end sections of the conduit to one another in a configuration symmetric about a center plane perpendicularly intersecting with the center section of the conduit and dividing the conduit into two equal opposite halves, wherein an electromagnetic vibrator generates a flexural vibration of the conduit in a symmetric mode about the center plane and two vibration sensors measure the flexural vibration of the conduit at two locations located symmetrically about the center plane, and the mass flow rate of media moving through the conduit is determined as a function of a difference between two flexural vibrations respectively measured by the two vibration sensors.

20 Claims, 2 Drawing Sheets

SINGLE VIBRATING CONDUIT MASS FLOWMETER

FIELD OF THE INVENTION

The present invention relates to a Coriolis force mass flowmeter employing a single vibrating conduit that is flexurally vibrated in a symmetric mode with respect to the center section of the conduit dividing the conduit into two equal opposite halves, and determining the mass flow rate as a function of difference in the flexural vibration between the two equal opposite halves of the conduit.

BACKGROUND OF INVENTION

Without any exception, the Coriolis force mass flowmeter being marketed at the present time commands very high prices starting from 5,000 dollars and up depending on the size of the flowmeter. One of the co-inventors of the present invention has invented an electronic data processing method for determining the mass flow rate of media as a linear function of ratio of two values of a first alternating electrical signal representing the flexural vibration of the conduit at a first section thereof respectively measured at two instants when a second alternating electrical signal representing the flexural vibration of the conduit at a second section thereof reaches a zero value and a peak value (U.S. Pat. No. 5,184,518), which data processing method can be executed by a very inexpensive data processor costing no more than 50 to 100 dollars in contrast to the 2,500 to 3,000 dollar data processor available at the present time. A highly accurate and very inexpensive Coriolis force mass flowmeter can be provided when the above-mentioned inexpensive data processor is combined with an inexpensive mechanical sensor of the Coriolis force flowmeter. The major portion of the manufacturing cost of the existing versions of the mechanical sensor in the Coriolis force flowmeter results from the assembly employing a matched pair of vibrating conduits and the fittings connecting the pair of vibrating conduits to the common inlet and the common outlet of the flowmeter. A mechanical sensor of the Coriolis force flowmeter employing a single vibrating conduit can be manufactured at a fraction of the cost required to manufacture the existing versions employing the matched pair of vibrating conduit. When a mechanical sensor of the Coriolis force flowmeter employing a single vibrating conduit is combined with the simple and inexpensive electronic data processor executing the method disclosed in U.S. Pat. No. 5,184,518, the cost of the Coriolis force flowmeter can be brought down from the existing price of 5,000 dollars and up to 1,500 to 3,000 dollars range.

BRIEF SUMMARY OF INVENTION

The primary object of the present invention is to provide a Coriolis force mass flowmeter employing a single vibrating conduit that is flexurally vibrated in a symmetric mode with respect to the center section of the conduit dividing the conduit into two equal opposite halves.

Another object is to provide a Coriolis force mass flowmeter that employs a single vibrating conduit including two end sections respectively extending from two secured extremities of the conduit in a parallel and over-hanging relationship and a looped midsection of a loop angle equal to 360 degrees connecting the two end sections of the conduit to one another in a configuration symmetric about the center section of the conduit dividing the conduit into two equal opposite halves, wherein an electromagnetic vibrator with action and reaction halves respectively secured to the combination of the two end sections of the conduit and to the center section of the looped midsection of the conduit generates a flexural vibration of the looped midsection of the conduit in a symmetric mode with respect to the center section of the conduit in directions substantially perpendicular to the looped midsection of the conduit, and the mass flow rate of media moving through the conduit is determined as a function of phase angle difference in the flexural vibration of the conduit between the two opposite halves of the conduit.

A further object is to provide a Coriolis force mass flowmeter that employs a single vibrating conduit of geometry defined in the afore-mentioned another object of the present invention, wherein an electromagnetic vibrator with action and reaction halves respectively secured to the two end sections of the conduit generates a relative flexural vibration between the two opposite halves of the conduit in directions parallel to the looped midsection of the conduit and perpendicular to the two end sections of the conduit in a symmetric mode with respect to the center section of the conduit, and the mass flow rate of media is determined as a function of phase angle difference in the relative flexural vibration between the two opposite equal halves of the conduit wherein the relative flexural vibration occurs between each of the two end sections of the conduit and each of the two opposite equal halves of the looped midsection of the conduit.

Yet another object is to provide a Coriolis force mass flowmeter that employs a single vibrating conduit including two end sections respectively extending from two secured extremities of the conduit in a parallel and over-hanging relationship and a looped midsection of a loop angle equal to 720 degrees comprising two 360 degree loops disposed in a superimposing relationship with a space therebetween, which looped midsection of the conduit connects the two end sections of the conduit to one another in a configuration symmetric with respect to the center section of the conduit, wherein the two 360 degree loops are respectively disposed on two approximately parallel planes and the two end sections of the conduit are disposed intermediate the two approximately parallel planes; wherein an electromagnetic vibrator with action and reaction halves respectively secured to the two 360 degree loops generates a relative flexural vibration between the two 360 degree loops in directions substantially perpendicular to the two 360 degree loops in a symmetric mode about a center plane perpendicularly intersecting with the two 360 degree loops and dividing the conduit into two equal opposite halves, and the mass flow rate of media is determined as a function of phase angle difference in the relative flexural vibration between the two opposite equal halves of the combination of the two 360 degree loops respectively located on the two opposite sides of the center plane.

These and other objects of the present invention will become clear as the description thereof progresses.

BRIEF DESCRIPTION OF FIGURES

The present invention may be described with a greater clarity and specificity by referring to the following figures.

PRINCIPLES OF OPERATION

Figure 1:
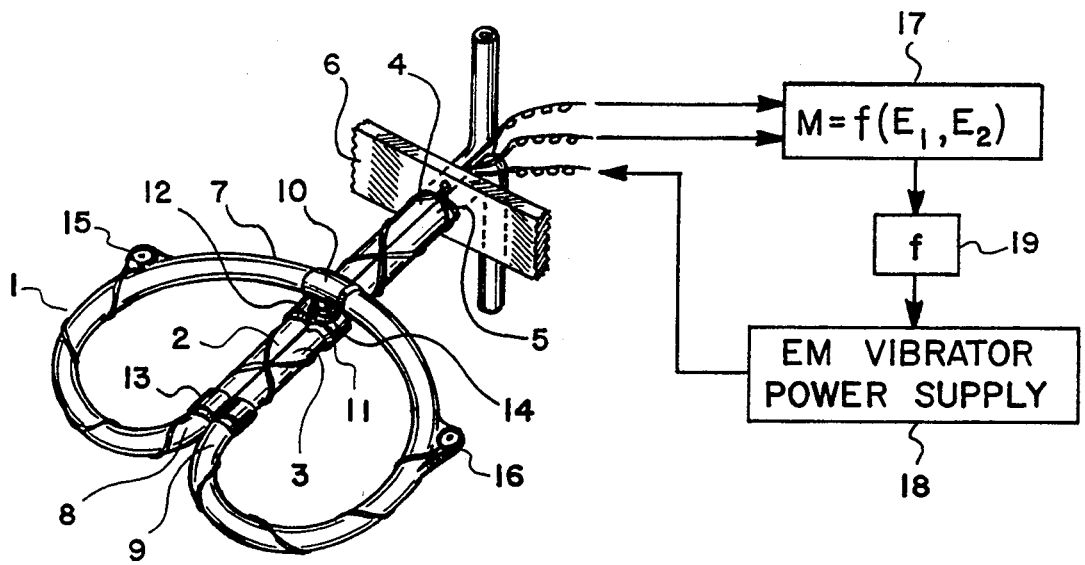
FIG. 1 illustrates an embodiment of the Coriolis force flowmeter of the present invention employing a single conduit with a single 360 degree loop flexurally vibrated in directions perpendicular to the 360 degree loop.

When a conduit with the two extremities secured to a supporting structure has a geometry symmetric about the center section of the conduit dividing the conduit into two equal opposite halves, and an electromagnetic vibrator disposed on a center plane perpendicularly intersecting with the center section of the conduit and dividing the conduit into the two equal opposite halves generates a flexural vibration of the conduit, the conduit experiences a primary flexural vibration of symmetric mode with respect to the center plane as a result of the vibratory force exerted by the electromagnetic vibrator and a secondary flexural vibration of antisymmetric mode with respect to the center plane as a result of the dynamic interaction between the symmetric primary flexural vibration of the conduit and the convective inertia force of the fluid media moving through the conduit. It can be easily shown by simultaneously solving the equations of motions of a conduit under flexural vibration and of media moving through the conduit that the flexural vibration of a conduit created by a combined effect of an electromagnetic vibrator exerting a vibratory force on the conduit and the inertia force of the media moving through the conduit is described by the following equation:

$$v(x, t) = v_0(x)\cos\omega t + \frac{\dot{M}}{EI} v_1(x)\sin\omega t, \quad (1)$$

where $v(x,t)$ is the velocity of the flexural vibration of the conduit at a section at a distance x from the midsection of the conduit and at time t, $\omega$ is the circular frequency of the flexural vibration of the conduit, $\dot{M}$ is the mass flow rate of media moving through the conduit, E is the modulus of elasticity of the material making up the conduit, I is the moment of inertia of the cross sectional area of the conduit, $v_0(x)\cos\omega t$ is the primary flexural vibration of the conduit created by the electromagnetic vibrator, and $(\dot{M}/EI) V_1(x) \sin\omega t$ is the secondary flexural vibration of the conduit created by the dynamic interaction between the primary flexural vibration of the conduit and tile convective motion of the media moving through the conduit; wherein $v_1(x)$ is related to $V_0(x)$ by the following differential equation:

$$\frac{d^4 v_1(x)}{dx^4} - \frac{m + \rho S}{EI} \omega^2 v_1(x) = -\omega \frac{dv_0(x)}{dx}, \quad (2)$$

where m is the mass of the conduit per unit length thereof, $\rho$ is the density of the media moving through the conduit, and S is the cross sectional area of the flow passage provided by the conduit. When the conduit containing the moving media is flexurally vibrated at a natural frequency thereof, which natural frequency is give by equation $$\omega = K\sqrt{\frac{EI}{m + \rho S}}, \quad (3)$$

the equation (2) reduces to the following form:

$$\frac{d^4 v_1(x)}{dx^4} - K^2 v_1(x) = -\omega \frac{dv_0(x)}{dx}, \quad (4)$$

where K is a characteristic constant determined by the boundary conditions of the vibrating conduit. By using the addition or subtraction formula of the trigonometric functions, it can be easily shown that equation (1) can be written in the form $$v(x,t) = A(x)\{\cos[\omega t - \phi(x)]\}, \quad (5)$$

where $$A(x) = \sqrt{[v_0(x)]^2 + \left[\frac{\dot{M}}{EI} v_1(x)\right]^2}, \quad (6)$$

and $$\tan\phi(x) = \frac{v_1(x)}{v_0(x)} \frac{\dot{M}}{EI}. \quad (7)$$

Two motion sensors respectively located at x=a and x=b provide two alternating electrical signals respectively proportional to $v(x,t)$ given by equation (5) wherein x therein is now substituted with a and b, which two alternating electrical signals are of the following forms:

$$E_a(t) = \alpha A_a \cos(\omega t - \phi_a), \quad (8)$$

and $$E_b(t) = \beta A_b \cos(\omega t - \phi_b), \quad (9)$$

where $\alpha$ and $\beta$ are respectively tile electrical amplification coefficients of the two motion sensors. It should be understood that the equations (1) through (9) are valid for all modes of the flexural vibration of the conduit which may be symmetric, antisymmetric or asymmetric about the midsection of the conduit.

The equations (8) and (9) satisfy the following relationships:

$$E_a(t) = \alpha A_a \sin(\phi_a - \phi_b) \text{ when } E_b(t) \text{ reaches a zero value,} \quad (10)$$

and $$E_a(t) = \alpha A_a \cos(\phi_a - \phi_b) \text{ when } E_b(t) \text{ reaches a peak value.} \quad (11)$$

The ratio of equation (10) to equation (11) provides equation $$\frac{E_a(t)|E_b(t) = 0}{E_a(t)|E_b(t) = \text{PEAK}} = \tan(\phi_a - \phi_b). \quad (12)$$

When equations (7) and (12) are combined to eliminate $\tan \phi(x)$, the following equation results:

$$\dot{M} = C \frac{E_a(t)|E_b(t) = 0}{E_a(t)|E_b(t) = \text{PEAK}}, \quad (13)$$

where $$C = EI / \left[ \frac{v_1(a)}{v_0(a)} - \frac{v_1(b)}{v_0(b)} \right]. \quad (14)$$

According to equation (13), the mass flow rate of media moving through the vibrating conduit can be determined as a function of the ratio of a first value of one of the two alternating electrical signals measured at a first instant when the other of the two alternating electrical signals reaches a zero value to a second value of said one of the two alternating electrical signals measured at a second instant when said the other of the two alternating electrical signals reaches a peak value. The equation (10) can be written in the form $$\frac{E_a(t)|E_b(t) = 0}{\text{Amp} \cdot E_a(t)} = \sin(\phi_a - \phi_b), \quad (15)$$

where Amp.$E_a(t)$ stands for the amplitude of $E_a(t)$. In most cases of mass flow measurement, the phase angle difference $(\phi_a - \phi_b)$ is less than five to ten degrees and $\sin(\phi_a - \phi_b)$ can be approximated by $\tan(\phi_a - \phi_b)$, and consequently, equation (15) can be written in the following approximate form:

$$\frac{E_a(t)|E_b(t) = 0}{\text{Amp} \cdot E_a(t)} = \tan(\phi_a - \phi_b). \quad (16)$$

When equations (7) and (16) are combined to eliminate $\tan\phi(x)$, the following approximate form of equation (13) is obtained:

$$\dot{M} = C \frac{E_a(t)|E_b(t) = 0}{\text{Amp} \cdot E_a(t)}, \quad (17)$$

where the constant of proportionality C given by Equation (14) is determined empirically in using equation (17). According to equation (17), the mass flow rate of media moving through the vibrating conduit can be determined as a function of the ratio of a value of one of the two alternating electrical signals measured at an instant when the other of the two alternating electrical signals reaches a zero value to the amplitude of said one of the two alternating electrical signals.

It can be readily discovered that equations (8) and (9) satisfy the following relationships:

$$\dot{E}_a(t)E_b(t) - E_a(t)\dot{E}_b(t) = \omega \alpha \beta A_a A_b \sin(\phi_a - \phi_b), \quad (18)$$

and $$\dot{E}_a(t)\dot{E}_b(t) + \omega^2 E_a(t)E_b(t) = \omega^2 \alpha \beta A_a A_b \cos(\phi_a - \phi_b), \quad (19)$$

where $\dot{E}_a(t)$ and $\dot{E}_b(t)$ respectively stand for the time derivatives of $E_a(t)$ and $E_b(t)$. The ratio of equation (18) to equation (19) yields a relationship $$\frac{\dot{E}_a(t)E_b(t) - E_a(t)\dot{E}_b(t)}{\frac{1}{\omega} \dot{E}_a(t)\dot{E}_b(t) + \omega E_a(t)E_b(t)} = \tan(\phi_a - \phi_b). \quad (20)$$

When equations (7) and (20) are combined to eliminate $\tan(\phi_a - \phi_b)$, the following equation results:

$$\dot{M} = C \frac{\dot{E}_a(t)E_b(t) - E_a(t)\dot{E}_b(t)}{\frac{1}{\omega} \dot{E}_a(t)\dot{E}_b(t) + \omega E_a(t)E_b(t)}. \quad (21)$$

According to equation (21), the mass flow rate of media moving through the vibrating conduit can be determined as a function of the ratio of a differential combination of a product between the first alternating electrical signal and the time derivative of the second alternating electrical signal and a product between the second alternating electrical signal and the time derivative of the first alternating electrical signal to an additive combination of a product between the time derivatives of the first and second alternating electrical signals divided by the circular frequency of the first and second alternating electrical signals and a product between the first and second alternating electrical signals times the circular frequency of the first and second alternating electrical signals. When $\sin(\phi_a - \phi_b)$ appearing on the right hand side of equation (18) is approximated by $\tan(\phi_a - \phi_b)$ and use of equation (7) is made to eliminate $\tan(\phi_a - \phi_b)$, the following approximate form of equation (21) is obtained:

$$\dot{M} = C \frac{\dot{E}_a(t)E_b(t) - E_a(t)\dot{E}_b(t)}{\omega[\text{Amp} \cdot E_a(t)][\text{Amp} \cdot E_b(t)]}. \quad (22)$$

According to equation (22), the mass flow rate of media moving through the vibrating conduit can be determined as a function of the ratio of a differential combination of a product between the first alternating electrical signal and the time derivative of the second alternating electrical signal and a product between the second alternating electrical signal and the time derivative of the first alternating electrical signal to a product between the amplitudes of the first and second alternating electrical signals.

When the two motion sensors respectively generating the two alternating electrical signals given by equations (8) and (9) are located symmetrically about the midsection of the vibrating conduit, $\phi_a = -\phi_b = \phi$, and equations (8) and (9) satisfy the following relationships:

$$e_a(t) - e_b(t) = 2\sin\omega t \sin\phi, \tag{23}$$

and $$e_a(t) + e_b(t) = 2\cos\omega t \cos\phi, \tag{24}$$

where $e_a(t)$ and $e_b(t)$ respectively stand for the normalized form of $E_a(t)$ and $E_b(t)$, where the normalized form of an alternating electrical signal is defined by the ratio of the alternating electrical signal to the amplitude of the alternating electrical signal. The ratio of equation (23) to equation (24) provides the relationship $$\frac{\text{Amp} \cdot [e_a(t) - e_b(t)]}{\text{Amp} \cdot [e_a(t) + e_b(t)]} = \tan\phi. \tag{25}$$

When equations (7) and (25) are combined to eliminate $\tan\phi(x)$, the following equation results:

$$\dot{M} = C \frac{\text{Amp} \cdot [|e_a(t)| - |e_b(t)|]}{\text{Amp} \cdot [|e_a(t)| + |e_b(t)|]}, \tag{26}$$

where the absolute values $|e_a(t)|$ and $|e_b(t)|$ are employed, whereby equation (26) is valid for the vibrating conduit under a flexural vibration of a symmetric mode as well as an antisymmetric mode about the midsection of the vibrating conduit. The absolute value of an alternating electrical signal is equal to the square root of the square of the alternating electrical signal. According to equation (26), the mass flow rate of media moving through the vibrating conduit can be determined as a function of the ratio of the amplitude of a differential combination of the absolute values of the normalized first and second alternating electrical signals to the amplitude of an additive combination of the absolute values of the normalized first and second alternating electrical signals. The equation (23) provides the relationship $$\text{Amp.}[e_a(t) - e_b(t)] = 2\sin\phi. \tag{27}$$

When $\sin\phi$ appearing on the right hand side of equation (27) is approximated by $\tan\phi$ and use of equation (7) is made to eliminate $\tan\phi(x)$, the following equation results:

$$\dot{M} = \frac{C}{2} \text{Amp} \cdot [|e_a(t)| - |e_b(t)|]. \tag{28}$$

According to equation (38), the mass flow rate of media moving through the vibrating conduit can be determined as a function of the amplitude of a differential combination of the absolute values of the normalized first and second alternating electrical signals.

When the two motion sensors respectively generating the two alternating electrical signals given by equations (8) and (9) are located symmetrically about the midsection of the vibrating conduit, $\phi_a = -\phi_b = \phi$, and equations (8) and (9) satisfy the following relationships:

$$[e_a(t)]^2 - [e_b(t)]^2 = \sin 2\omega t \sin 2\phi, \tag{29}$$

and $$\dot{e}_a(t)e_b(t) + e_a(t)\dot{e}_b(t) = \omega \sin 2\omega t. \tag{30}$$

The ratio of equation (29) to equation (30) yields the relationship $$\frac{[e_a(t)]^2 - [e_b(t)]^2}{\dot{e}_a(t)e_b(t) + e_a(t)\dot{e}_b(t)} = \frac{1}{\omega} \sin 2\phi. \tag{31}$$

When $\sin 2\phi$ appearing on the right hand side of equation (31) is approximated by $\tan 2\phi$ and use of equation (7) is made to eliminate $\tan 2\phi$, the following equation results:

$$\dot{M} = \frac{C\omega}{2} \frac{[e_a(t)]^2 - [e_b(t)]^2}{\dot{e}_a(t)e_b(t) + e_a(t)\dot{e}_b(t)}. \tag{32}$$

According to equation (32), the mass flow rate of media moving through the vibrating conduit can be determined as a function of the ratio of a differential combination of the square of the normalized first and second alternating electrical signals to an additive combination of a product between the first alternating electrical signal and the time derivative of the second alternating electrical signal and a product between the second alternating electrical signal and the time derivative of the first alternating electrical signal, which additive combination is equal to the time derivative of the product between the first and second alternating electrical signals. It is readily recognized that equation (29) yields the relationship $$\text{Amp.}\{[e_a(t)]^2 - [e_b(t)]^2\} = \sin 2\phi. \tag{33}$$

When $\sin 2\phi$ appearing on the right hand side of equation (33) is approximated by $\tan 2\phi$ and use of equation (7) is made to eliminate $\tan 2\phi$, the following equation results $$\dot{M} = \frac{C}{2} \text{Amp} \cdot \{[e_a(t)]^2 - [e_b(t)]^2\}. \tag{34}$$

According to equation (34), the mass flow rate of media moving through the vibrating conduit can be determined as a function of the amplitude of a differential combination of the squares of the normalized first and second alternating electrical signals.

When use of equation (12) is made, equation (13) can be written in the form $$\dot{M} = C \tan(\phi_a - \phi_b). \tag{35}$$

The equation (17) can be written in the following form when use of equation (15) is made:

$$\dot{M} = C \sin(\phi_a - \phi_b). \tag{36}$$

In most cases of the practice of mass flow measurement, the phase angle difference $(\phi_a - \phi_b)$ is equal to or less than a few degrees and, consequently, equations (35) and (36) can be approximated by equation $$\dot{M} = C(\phi_a - \phi_b). \tag{37}$$

According to equations (35), (36), or (37), the mass flow rate of media can be determined as a function of a measured value of the phase angle difference between the two alternating electrical signals respectively generated by the two motion sensors measuring the flexural vibration of the conduit respectively at two different sections of the conduit. In conventional method of determining the mass flow rate of media, the phase angle difference $(\phi_a - \phi_b)$ is measured by clocking the time interval between the zero crossings of the two alternating electrical signals or between the peakings of the two alternating electrical signals and then by multiplying the circular frequency $\omega$ to the measured value of the time interval. The substitution of the so determined phase angle difference $(\phi_a - \phi_b)$ into equation (35), (36), or (37) provides the mass flow rate of media in the conventional operating principles of the Coriolis force mass flowmeter. The embodiments of the Coriolis force flowmeter taught by the present invention may be operated on principles based on any one of equations (13), (17), (21), (22), (26), (28), (32), (34), (35), (36), (37) or other mathematical relationships known in the art, which define the mathematical relationship between the mass flow rate of media and a difference between the two alternating electrical signals.

DESCRIPTION OF ILLUSTRATED EMBODIMENTS

In FIG. 1 there is illustrated an embodiment of the Coriolis force flowmeter of the present invention employing a single conduit with a 360 degree loop under a flexural vibration in directions substantially perpendicular to a plane defined by the conduit center line of the 360 degree loop. The conduit center line is the line passing through the geometric center of every cross section of the conduit. The conduit 1 providing the flow passage for the media comprises two end sections 2 and 3 respectively extending towards a common direction in a side-by-side parallel relationship from two extremities 4 and 5 of the conduit I secured to a supporting structure 6, and a substantially planar looped midsection 7 of cardioid geometry having a loop angle equal to 360 degrees that connects the over-hanging extremities 8 and 9 of the two end sections 2 and 3 of the conduit i to one another in a configuration symmetric about the center plane perpendicularly intersecting with the center section 10 of the conduit and dividing the conduit into two equal opposite halves. The center section 10 of the conduit I over-laps a section 11 of the combination of the two end sections 2 and 3 located intermediate the secured and over-hanging extremities thereof in a spaced-apart relationship, at which over-lapping section 11 the two end sections 2 and 3 of the conduit 1 are mechanically tied together by a clamp or clip 12. The best result is obtained when the two end sections 2 and 3 of the conduit I are also mechanically tied together at the over-hanging extremities 8 and 9 thereof by a clamp or clip 13. The action and reaction halves of an electromagnetic vibrator 14 are respectively anchored to the center section 10 of the conduit and the tied-together section 11 of the combination of the two end sections 2 and 3 of the conduit over-lapping the center section 10 of the conduit. The electromagnetic vibrator 14 generates a flexural vibration of the looped midsection 7 of the conduit I in directions substantially perpendicular to the looped midsection 7 of the conduit in a symmetric mode with respect to the center plane dividing the conduit I into the two equal opposite halves. Two motion sensors 15 and 16 respectively included in two opposite halves of the looped midsection 7 of the conduit in a relationship symmetric about the center section 10 of the conduit provide two alternating electrical signals representing the flexural vibrations of the two opposite halves of the looped midsection 7 of the conduit 1, respectively. The most preferred type of the motion sensors 15 and 16 is the accelerometer type vibration sensor. The electronic data processor 17 determines the mass flow rate of media moving through the conduit 1 as a function of difference between the two alternating electrical signals respectively provided by the two motion sensors 15 and 16 by using an empirical counter part of equation (13), (17), (21), (22), (26), (28), (32), (34), (35), (36), (37), or other mathematical relationships known in the art. The electromagnetic power supply 18 energizes the electromagnetic vibrator 14 with an alternating or pulsating electric current with a frequency matched to the natural frequency f of the flexural vibration of the looped midsection 7 of the conduit 1, which natural frequency f is detected by a frequency detector 19 receiving one or both of the two alternating electrical signals generated respectively by the two motion sensors 15 and 16 of an accelerometer type. It should be mentioned that the eletromagnetic vibrator 14 generates the primary flexural vibration of the conduit in a symmetric mode with respect to the center section 10 of the conduit, while dynamic interaction between the symmetric primary flexural vibration of the conduit and the convective inertia force of media flowing through the flexurally vibrating conduit generates the secondary flexural vibration of the conduit in an antisymmetric mode about the center section 10 of the conduit, wherein the level of the antisymmetric secondary flexural vibration of the conduit, that varies as a function of the mass flow rate of media, is measured in the form of the phase angle difference between the two alternating electrical signals representing the resultant flexural vibration of the conduit respectively at two locations located symmetrically about the center section 10 of the conduit. In general, the noise vibration of the conduit created by the ambient structural vibration occurs in a symmetric mode about the center section 10 of the conduit and, consequently, it is necessary to generate the primary flexural vibration of the conduit in the symmetric mode in order to facilitate the secondary flexural vibration of the conduit to occur in the antisymmetric mode, whereby the symmetric noise vibration of the conduit does not add to the antisymmetric secondary flexural vibration of the conduit in measuring the level of the antisymmetric secondary flexural vibration of the conduit as a measure of the mass flow rate of media. If the primary flexural vibration of the conduit is created in an antisymmetric mode and the secondary flexural vibration of the conduit occurs in a symmetric mode, the symmetric noise vibration of the conduit is indistinguishable from the symmetric secondary flexural vibration of the conduit and, consequently, the symmetric noise vibration of the conduit introduces a serious error in the mass flow measurement. It is well known fact that the natural frequency f of the flexural vibration of the looped midsection 7 of the conduit 1 varies as a function of the density of media contained in the conduit. The data processor 17 may execute an additional algorithm that determines the density of media as a function of the natural frequency f of the flexural vibration of the looped midsection 7 of the conduit 1.

Figure 2:
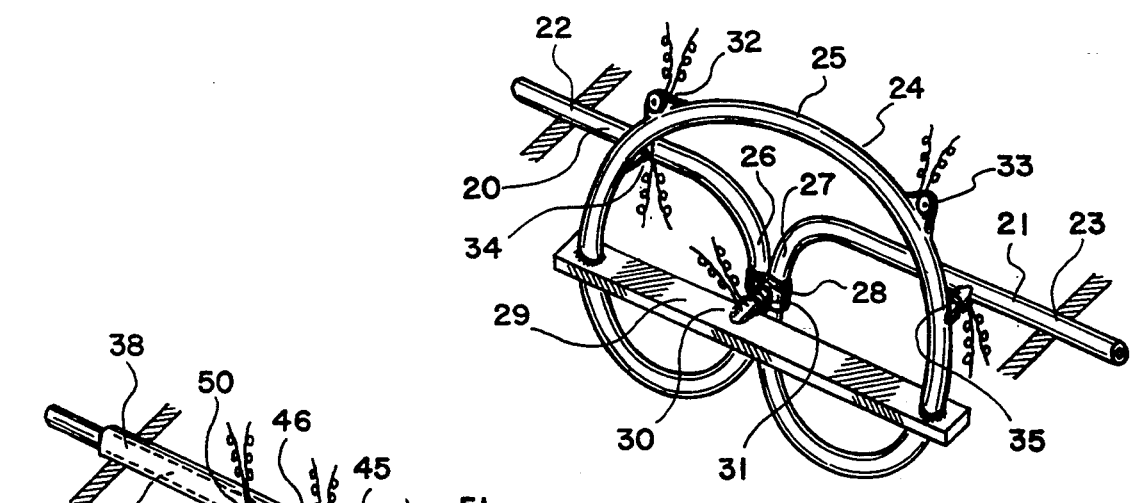
FIG. 2 illustrates another embodiment of the Coriolis force flowmeter of the present invention employing a single conduit with a single 360 degree loop flexurally vibrated in directions perpendicular to the 360 degree loop.

In FIG. 2 there is illustrated another embodiment of the Coriolis force flowmeter of the present invention employing a single conduit with a single 360 degree loop under a flexural vibration in directions substantially perpendicular to a plane defined by the 360 degree loop. The two end sections 20 and 21 of the conduit are disposed on a common plane and extend towards one another respectively from the two secured extremities 22 and 23, and are connected to one another by a cardioid shaped looped midsection 24 of 360 degree loop angle in a configuration symmetric with respect to the center plane perpendicularly intersecting with the center section 25 of the conduit and dividing the conduit into two equal opposite halves. The curved over-hanging extremities 26 and 27 of the two end sections 20 and 21 converge to one another and are mechanically tied together by a clamp or clip 28. The looped midsection 24 of the conduit straddles a line connecting the two secured extremities 22 and 23 of the conduit. The two opposite halves of the looped midsection 24 of the conduit are braced to one another by a stiff elongated bracing member 29 disposed parallel to the line connecting the two secured extremities 22 and 23 of the conduit in a relationship wherein the curved over-hanging extremities of the end sections 20 and 21 of the conduit tied together by the clamp or clip 28 and the midsection 30 of the elongated bracing member 29 are superimposed to one another with a spacing therebetween. The action and reaction halves of the electromagnetic vibrators 31 are respectively secured to the midsection 30 of the elongated bracing member 29 and the combination of the curved over-hanging extremities 26 and 27 of the two end sections 20 and 21 of the conduit at sections tied together by the clamp or clip 28. The two alternating electrical signals are respectively supplied by a pair of motion sensors 32 and 33 of an accelerometer type included in the two opposite halves of the looped midsection 24 in a symmetric relationship about the center section 25 of the conduit, or by a pair of relative motion sensors 34 and 35 disposed in a symmetric relationship with respect to the center section 25 of the conduit, each of which relative motion sensors 34 and 35 measures the relative flexural vibration between each of the two opposite halves of the looped midsection 24 of the conduit and each of the two end sections 20 and 21 of the conduit.

Figure 3:
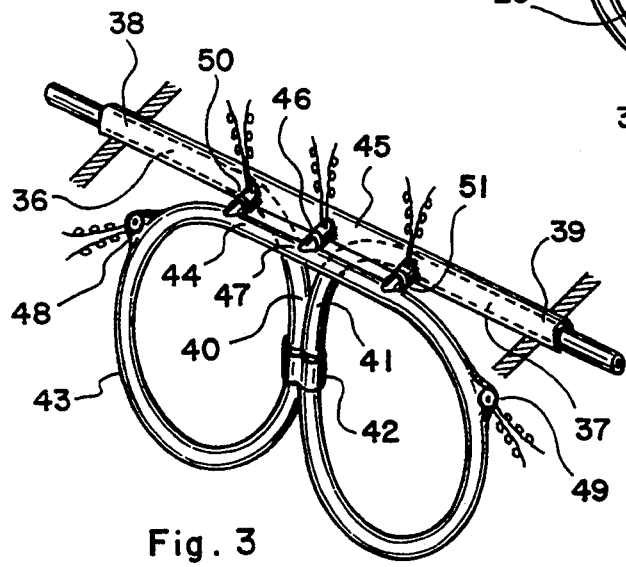
FIG. 3 illustrates a further embodiment of the Coriolis force flowmeter of the present invention employing a single conduit with a single 360 degree loop flexurally vibrated in directions perpendicular to the 360 degree loop.

In FIG. 3 there is illustrated a further embodiment of the Coriolis force flowmeter of the present invention employing a single conduit having a single 360 degree loop under a flexural vibration in directions substantially perpendicular to a plane defined by the 360 degree loop. The two end sections 36 and 37 of the conduit extend towards one another respectively from the two secured extremities 38 and 39 of the conduit, wherein the curved over-hanging extremities 40 and 41 of the two end sections 36 and 37 of the conduit converge to one another and are mechanically tied together by a clamp or clip 42, and are connected to one another by a cardioid shaped looped midsection 43 of 360 degree loop angle in a configuration symmetric with respect to the center plane perpendicularly intersecting with the center section 47 of the conduit and dividing the conduit into two equal opposite halves, which looped midsection 43 has a substantially straight central portion 44 disposed parallel to a line connecting the two secured extremities 38 and 39 of the conduit. The straight portions of the two end sections 36 and 37 of the conduit respectively adjacent to the two secured extremities 38 and 39 of the conduit are structurally connected to one another by a stiff elongated bracing member 45 with a U-shaped cross section, which elongated bracing member secured to the two end sections 36 and 37 of the conduit by means of pressure fitting or welding may extend partially or entirely over the distance between the two secured extremities 38 and 39 of the conduit. An electromagnetic vibrator 46 disposed on the center plane perpendicularly intersecting the center section 47 of the conduit and dividing the conduit into two equal opposite halves and having the action and reaction halves respectively secured to the center section 47 of the conduit and the center section of the elongated bracing member 45 generates a relative flexural vibration between the looped midsection 43 of the conduit and the elongated bracing member 45 in directions substantially perpendicular to a plane defined by the looped midsection 43 of the conduit. The two alternating electrical signals are respectively supplied by a pair of motion sensors 48 and 49 included in the two opposite halves of the looped midsection 43 of the conduit in a symmetric relationship with respect to the center section 47 of the conduit, or by a pair of relative motion sensors 50 and 51 disposed in a symmetric relationship with respect to the center section 47 of the conduit, wherein the two relative motion sensors 50 and 51 measure the relative flexural vibration between the substantially straight central portion 44 of the looped midsection 43 of the conduit and the elongated bracing member 45.

Figure 4:
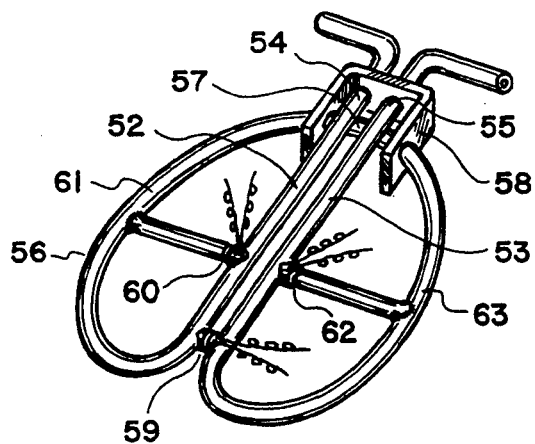
FIG. 4 illustrates an embodiment of the Coriolis force flowmeter of the present invention employing a single conduit with a single 360 degree loop, wherein the two equal opposite halves of the conduit are vibrated relative to one another in directions parallel to the 360 degree loop.

In FIG. 4 there is illustrated an embodiment of the Coriolis force flowmeter of the present invention employing a single conduit having a single 360 degree loop, wherein the two opposite halves of the conduit are vibrated relative to one another in directions substantially parallel to a plane defined by the 360 degree loop and perpendicular to the two end sections of the conduit The two end sections 52 and 53 extend towards a common direction in a parallel and spaced-apart relationship respectively from the two secured extremities 54 and 55 of the conduit, and connected to one another by a cardioid shaped looped midsection 56 of 360 degree loop angle in a configuration symmetric about the center plane perpendicularly intersecting with the center section 57 of the conduit and dividing the conduit into two equal opposite halves. The central portion of the curved midsection 56 of the conduit straddling the center section 57 of the conduit and superimposed to the two end sections 52 and 53 of the conduit with a spacing therebetween may be also secured to a supporting structure 58 anchoring the two secured extremities 54 and 55 of the conduit. It should be noticed that the central portion of the looped midsection 56 of the conduit is disposed on a plane substantially parallel to a plane including the center lines of the two end sections 52 and 53 of the conduit. An electro-magnetic vibrator 59 disposed at the over-hanging extremities of the two end sections 52 and 53 of the conduit vibrates the two opposite halves of the conduit relative to one another in directions substantially parallel to a plane defined by the looped midsection 56 of the conduit and substantially perpendicular to the two end sections 52 and 53 of the conduit. The two alternating electrical signals are respectively provided by a first relative motion sensor 60 measuring the relative flexural vibration between the first half 61 of the looped midsection 56 of the conduit connected to the first end section 52 and the first end section 52 of the conduit, and by a second relative motion sensor 62 measuring the relative flexural vibration between the second half 63 of the looped midsection 56 of the conduit connected to the second end section 53 of the conduit and the second end section 53 of the conduit. In an alternative design, the pair of relative motion sensors 60 and 62 may be replaced by a pair of motion sensors of an accelerometer type respectively included in the two opposite halves 61 and 63 of the looped midsection 56 of the conduit or in the two end sections 52 and 53 of the conduit in a relationship symmetric about the center section 57 of the conduit.

Figure 5:
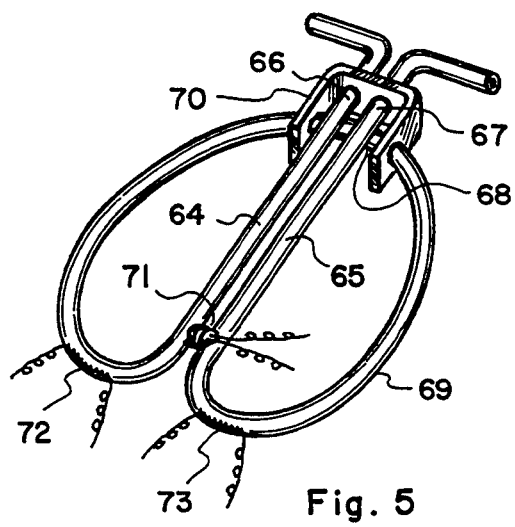
FIG. 5 illustrates another embodiment of the Coriolis force flowmeter of the present invention employing a single conduit with a single 360 degree loop, wherein the two equal opposite halves of the conduit are vibrated relative to one another in directions parallel to the 360 degree loop.

In FIG. 5 there is illustrated another embodiment of the Coriolis force flowmeter employing a single conduit having a single 360 degree loop, wherein the two opposite halves of the conduit are vibrated relative to one another in directions parallel to the 360 degree loop. The conduit employed in this illustrative embodiment has the same configuration as that described in conjunction with FIG. 4. The two end sections 64 and 65 disposed in a parallel and spaced apart relationship extend respectively from the two secured extremities 66 and 67 of the conduit. The central portion 68 of the looped midsection 69 of the conduit is also secured to the supporting structure 70 anchoring the two extremities 66 and 67 of the conduit. An electromagnetic vibrator 71 disposed at the over-hanging extremities of the two end sections 64 and 65 of the conduit vibrates the two opposite halves of the conduit relative to one another in directions parallel to the looped midsection 69 of the conduit. The two alternating electrical signals are generated by a pair of stress sensors 72 and 73 respectively included in the two curved junctions between the over-hanging extremities of the two end sections 64 and 65 of the conduit and the two extremities of the looped midsection 69 of the conduit in a symmetric relationship about a plane perpendicularly intersecting with the center section of the conduit and dividing the conduit into two equal opposite halves. It should be understood that the looped midsection of the conduit included in the embodiments shown in FIGS. 4 and 5 may have an extensively elongated oblong geometry having two diametrically opposite sections of straight geometry parallel to the two end sections of the conduit, or of bowed geometry converging to the two end sections of the conduit.

Figure 6:
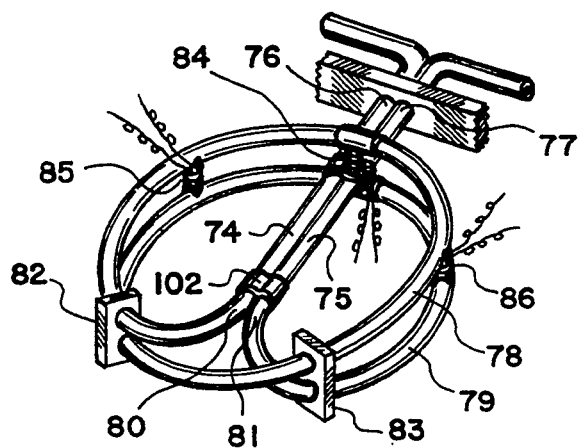
FIG. 6 illustrates an embodiment of the Coriolis force flowmeter of the present invention employing a single conduit with two 360 degree loops disposed in a superimposed relationship with a space therebetween, wherein the two 360 degree loops are vibrated relative to one another in directions perpendicular to the two 360 degree loops.

In FIG. 6 there is illustrated an embodiment of the Coriolis force flowmeter of the present invention employing a single conduit having double 360 degree loops under a relative flexural vibration therebetween in directions substantially perpendicular to the double 360 degree loops. The two end sections 74 and 75 of the conduit extend towards a common direction in a side-by-side parallel relationship respectively from two secured extremities 76 and 77 of the conduit, and are connected to one another by two 360 degree loops 78 and 79 superimposed to one another with a spacing therebetween in a configuration substantially symmetric about the center plane located intermediate the two end sections 74 and 75 of the conduit and intersecting with the two 360 degree loops 78 and 79 in substantially perpendicular relationships, wherein the combination of the two end sections 74 and 75 extends through a space between the two 360 degree loops 78 and 79 of the conduit towards the secured extremities 76 and 77 of the conduit. The best result is obtained when the over-hanging extremities 80 and 81 of the two end sections 74 and 75 are mechanically tied together by a clamp or clip 102, and the two 360 degree loops 78 and 79 are mechanically tied together by two brackets 82 and 83 respectively at two locations adjacent to the over-hanging extremities 80 and 81 of the two end sections 74 and 75 of the conduit and located symmetrically about the center plane. An electromagnetic vibrator 84 disposed on the center plane and anchored to the combination of the two end sections 74 and 75 of the conduit vibrates the two 360 degree loops 78 and 79 of the conduit relative to one another in directions substantially perpendicular to the two 360 degree loops 78 and 79 of the conduit. The two alternating electrical signals are respectively generated by two relative motion sensors 85 and 86 measuring the relative flexural vibration between the two 360 degree loops 78 and 79 of the conduit respectively at two locations located symmetrically about the center plane dividing the conduit into two equal opposite halves.

Figure 7:
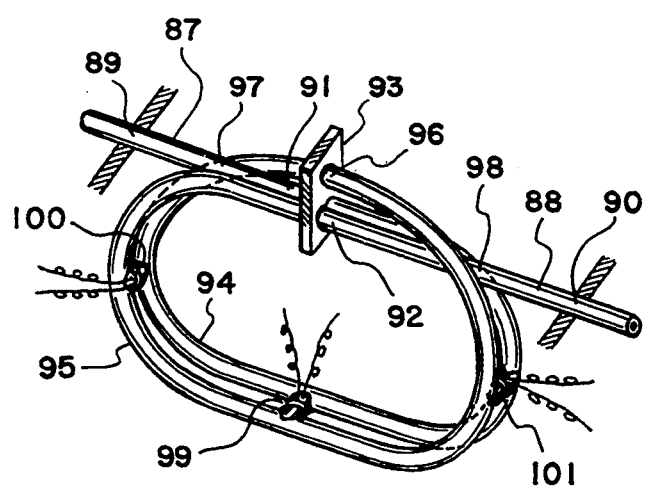
FIG. 7 illustrates another embodiment of the Coriolis force flowmeter of the present invention employing a single conduit with two 360 degree loops disposed in a superimposed relationship with a space therebetween, wherein the two 360 degree loops are vibrated relative to one another in directions perpendicular to the two 360 degree loops.

In FIG. 7 there is illustrated another embodiment of the Coriolis force flowmeter of the present invention employing a single conduit having double 360 degree loops under a relative flexural vibration therebetween in directions substantially perpendicular to the double 360 degree loops. The two end sections 87 and 88 of the conduit extend towards one another in a parallel relationship respectively from the two secured extremities 89 and 90 of the conduit, wherein the over-hanging extremities 91 and 92 of the two end sections 87 and 88 of the conduit are mechanically tied together by a clamp or bracket 93. The best result is obtained when the two end sections 87 and 88 of the conduit are disposed in such a way that the over-hanging extremities 91 and 92 thereof touch one another with zero spacing therebetween. The first of the two 360 degree loops 94 and 95 disposed in a superimposed relationship with a spacing therebetween and connecting the two end sections 87 and 88 of the conduit to one another is disposed approximately parallel to and on one side of a plane located intermediate the two end sections 87 and 88 of the conduit, and the other of the two 360 degree loops 94 and 95 is disposed approximately parallel to and on the other side of the plane located intermediate the two end sections 87 and 88 of the conduit, wherein the central portion of the conduit straddling the center section 96 extends across the plane located intermediate the two end sections 87 and 88 of the conduit in an oblique angle with respect to the plane. The best result is obtained when the center section 96 of the conduit is also secured to the clamp or bracket 93 mechanically tying the over-hanging extremities 91 and 92 of the two end sections 87 and 88 of the conduit. An improved result can be obtained when the two end sections 87 and 88, and a central portion of the conduit straddling the center section 96 of the conduit are mechanically tied together at two other sections 97 and 98 straddling the bracket 93 in a symmetrical relationship with respect to the bracket 93. An electromagnetic vibrator 99 disposed on the center plane intersecting the two 360 degree loops 94 and 95 of the conduit in a substantially perpendicular relationship and dividing the conduit into two equal opposite halves vibrates the two 360 degree loops 94 and 95 relative to one another in directions approximately perpendicular to the two 360 degree loops 94 and 95 of the conduit. The two alternating electrical signals are respectively provided by a pair of relative motions sensors 100 and 101 measuring the relative flexural vibration between the two 360 degree loops 94 and 95 of the conduit respectively at two sections of the combination thereof located symmetrically about the center plane dividing the conduit into two equal opposite halves. It should be understood that, the smaller the offset distance between the two end sections 87 and 88 of the conduit are, the primary relative flexural vibration between the two 360 degree loop 94 and 95 of the conduit generated by the electromagnetic vibrator 99 becomes more precisely symmetric about the center plane dividing the conduit into two equal opposite halves, and consequently, the mass flowmeter operates with a greater accuracy. Therefore, the arrangement of the double 360 degree loops of the conduit wherein the central portion of the conduit straddling the center section 96 of the conduit passing over the combination of the two end sections 87 and 88 of the conduit as shown in the particular illustrative embodiment, or passing under the combination of the two end sections 87 and 88 of the conduit in an alternative design, is a very important feature that makes the present invention work more accurately and reliably compared with other designs employing double 360 degree loops of the conduit under relative flexural vibration therebetween.

While the principles of the present inventions have now been made clear by the illustrative embodiments, there will be many modifications of the structures, arrangements, proportions, elements and materials, which are immediately obvious to those skilled in the art and particularly adapted to the specific working environments and operating conditions, and can be incorporated into the practice of the invention without departing from those principles. It is not desired to limit the inventions to the illustrative embodiments shown and described and accordingly, all suitable modifications and equivalents may be regarded as falling within the scope of the inventions as defined by the claims which follow.

The embodiment of the inventions, in which an exclusive property or privilege is claimed, are defined as follows:

1. An apparatus for measuring mass flow rate of media comprising in combination:
   a) a conduit with two extremities secured to a supporting structure including two end sections respectively extending from the two secured extremities of the conduit in over-hanging relationship and a looped midsection of loop angle substantially equal to 720 degrees with two 360 degree loops superimposed to one another with a space therebetween connecting the two end sections of the conduit to one another in a configuration substantially symmetric about a center plane perpendicularly intersecting with the two 360 degree loops and dividing the conduit into two equal opposite halves; wherein conduit center lines of the two 360 degree loops are respectively disposed substantially on two approximately parallel planes and the two end sections of the conduit are disposed parallel to and intermediate the two approximately parallel planes, and over-hanging extremities of the two end sections of the conduit are disposed in a side-by-side parallel relationship at a close proximity to one another and mechanically tied together;
   b) means for exerting a vibratory force on the two 360 degree loops in an action-reaction relationship on a single line disposed on the center plane in an approximately perpendicular relationship to the two approximately parallel planes, said vibratory force generating a relative flexural vibration between the two 360 degree loops in directions approximately perpendicular to the two approximately parallel planes; and
   c) first relative motion sensor located on one side of the center plane measuring the relative flexural vibration between first halves of the two 360 degree loops, and a second relative motion sensor located on the other side of the center plane opposite to said one side measuring the relative flexural vibration between second halves of the two 360 degree loops.

2. An apparatus as defined in claim 1 wherein said combination includes means for determining mass flow rate of media moving through the conduit as a function of a difference between two relative flexural vibrations respectively measured by the first and second relative motion sensors.

3. An apparatus for measuring mass flow rate of media comprising in combination:
   a) a conduit with two extremities restrained from experiencing lateral movements including two end sections respectively extending from the two restrained extremities in an over-hanging relationship and a looped midsection of cardioid shape of loop angle approximately equal to 360 degrees connecting the two end sections to one another in a configuration symmetric about a center plane perpendicularly intersecting with a center section of the looped midsection of the conduit and dividing the conduit into two substantially equal opposite halves, wherein at least a central portion of the looped midsection of the conduit and combination of the two end sections of the conduit over-lap one another with a space therebetween;
   b) an electromagnetic vibrator including an action and reaction element respectively affixed to the central portion of the looped midsection of the conduit and the combination of the two end sections of the conduit, wherein the electromagnetic vibrator exerts a vibratory force to the center section of the looped midsection of the conduit and the combination of the two end sections of the conduit in an action-reaction relationship and generates a relative flexural vibration between the looped midsection of the conduit and the combination of the two end sections of the conduit in directions substantially perpendicular to a plane parallel to the looped midsection of the conduit; and
   c) first means for measuring the flexural vibration of the looped midsection of the conduit at a first location located on one side of the center plane, and second means for measuring the flexural vibration of the looped midsection of the conduit at a second location located on the other side of the center plane opposite to said one side.

4. An apparatus as defined in claim 3 wherein said combination includes means for determining mass flow rate of media moving through the conduit as a function of a difference between two flexural vibrations respectively measured by said first and second means for measuring the flexural vibration.

5. An apparatus as defined in claim 4 wherein said means for determining mass flow rate of media determines the mass flow rate of media as a function of a phase angle difference between the two flexural vibrations respectively measured by the first and second means for measuring the flexural vibration.

6. An apparatus as defined in claim 3 wherein the two end sections of the conduit are disposed in a side-by-side relationship and extend towards a common direction from the two restrained extremities of the conduit, and the vibratory force is exerted on the center section of the looped midsection of the conduit and on a section of the combination of the two end sections of the conduit over-lapping the center section of the looped midsection of the conduit.

7. An apparatus as defined in claim 6 wherein said combination includes means for determining mass flow rate of media moving through the conduit as a function of a difference between two flexural vibrations respectively measured by said first and second means for measuring the flexural vibration.

8. An apparatus as defined in claim 6 wherein the two end sections of the conduit are mechanically tied together at sections adjacent to the looped midsection of the conduit.

9. An apparatus as defined in claim 3 wherein the two end sections of the conduit extend towards one another respectively from the two restrained extremities of the conduit and over-hanging extremities of the two end sections of the conduit are disposed at a close proximity to one another and mechanically tied together at sections adjacent to the looped midsection of the conduit, and two opposite halves of the looped midsection of the conduit are braced to one another by an elongated bracing member over-lapping the over-hanging extremities of the two end sections of the conduit tied together; wherein the vibratory force is exerted on a center section of the elongated bracing member and on the sections of the over-hanging extremities of the two end sections of the conduit tied together.

10. An apparatus as defined in claim 9 wherein said combination includes means for determining mass flow rate of media moving through the conduit as a function of a difference between two flexural vibrations respectively measured by said first and second means for measuring the flexural vibration.

11. An apparatus as defined in claim 9 wherein the first means for measuring the flexural vibration comprises a first relative motion sensor measuring relative flexural vibration between a first half of the looped midsection of the conduit and one of the two end sections of the conduit, and the second means for measuring the flexural vibration comprises a second relative motion sensor measuring relative flexural vibration between a second half of the looped midsection of the conduit and the other of the two end sections of the conduit.

12. An apparatus as defined in claim 11 wherein said combination includes means for determining mass flow rate of media moving through the conduit as a function of a difference between two flexural vibrations respectively measured by said first and second means for measuring the flexural vibration.

13. An apparatus as defined in claim 3 wherein the two end sections of the conduit extends towards one another respectively from the two restrained extremities of the conduit and are reinforced by an elongated bracing member disposed tangentially and secured to both of the two end sections of the conduit, and a central portion of the looped midsection of the conduit straddling the center section of the looped midsection of the conduit is disposed adjacent to the elongated bracing member on a plane parallel to the elongated bracing member with a space therebetween; wherein the vibratory force is exerted on the center section of the looped midsection of the conduit and on a center section of the elongated bracing member.

14. An apparatus as defined in claim 13 wherein said combination includes means for determining mass flow rate of media moving through the conduit as a function of a difference between two flexural vibrations respectively measured by said first and second means for measuring the flexural vibration.

15. An apparatus as defined in claim 13 wherein the first means for measuring the flexural vibration comprises a first relative motion sensor measuring relative flexural vibration between a first half of the looped midsection of the conduit and one of the two end sections of the conduit, and the second means for measuring the flexural vibration comprises a second relative motion sensor measuring relative flexural vibration between a second half of the looped midsection of the conduit and the other of the two end sections of the conduit.

16. An apparatus as defined in claim 15 wherein said combination includes means for determining mass flow rate of media moving through the conduit as a function of a difference between two flexural vibrations respectively measured by the first and second means for measuring the flexural vibration.

17. An apparatus for measuring mass flow rate of media comprising in combination:
a) a conduit with two extremities restrained from experiencing lateral movements including two end sections respectively extending from the two restrained extremities of the conduit in an over-hanging relationship and a looped midsection of a loop angle approximately equal to 720 degrees comprising two approximately 360 degree loops superimposed on one another with a space therebetween, wherein the looped midsection of the conduit connects the two end sections of the conduit to one another in a configuration substantially symmetric about a center plane perpendicularly intersecting with the two 360 degree loops and dividing the conduit into two substantially equal opposite halves, and a first half and a second half of each of the two 360 degree loops being respectively located on two opposite sides of the center plane; wherein conduit center lines of the two 360 degree loops are respectively disposed substantially on two approximately parallel planes respectively located on two opposite sides of the two end sections of the conduit, each of said conduit center lines being a line passing through the geometric center of every cross section of each of the two 360 degree loops;
b) means for exerting a vibratory force on the two 360 degree loops in an action-reaction relationship on a single line disposed on the center plane and perpendicular to the two approximately parallel planes, said vibratory force generating a relative flexural vibration between the two 360 degree loops in directions perpendicular to the two approximately parallel planes; and
c) first means for measuring the relative flexural vibration between the first halves of the 360 degree loops located on one side of the enter plane, and second means for measuring the relative flexural vibration between the second halves of the two 360 degree loops located on the other side of the center plane opposite to said one side.

18. An apparatus as defined in claim 17 wherein said combination includes means for determining mass flow rate of media moving through the conduit as a function of a difference between two relative flexural vibrations respectively measured by the first and second means for measuring the relative flexural vibration.

19. An apparatus as defined in claim 18 wherein said means for determining mass flow rate of media determines the mass flow rate of media as a function of a phase angle difference between the two relative flexural vibrations respectively measured by the first and second means for measuring the relative flexural vibration.

20. An apparatus as defined in claim 17 wherein the two 360 degree loops of the conduit are mechanically tied together at at least one location diametrically opposite to a midportion of combination of the two 360 degree loops of the conduit including said means for exerting the vibratory force.

* * * * *